United States Patent [19]

Hodgkins et al.

[11] 4,231,589

[45] Nov. 4, 1980

[54] SUPPORTING FRAME FOR A VEHICLE SEAT

[75] Inventors: Bernard E. Hodgkins, Trowbridge; Raymond C. C. Wadey, Westbury, both of England

[73] Assignee: Zimmer Orthopaedic Limited, London, England

[21] Appl. No.: 42,312

[22] Filed: May 29, 1979

[30] Foreign Application Priority Data

May 31, 1978 [GB] United Kingdom ............... 24840/78

[51] Int. Cl.[3] ............................................... B62D 21/00

[52] U.S. Cl. ....................................... 280/781; 296/63; 297/DIG. 4

[58] Field of Search ........................ 280/781, 788, 109; 296/63; 297/DIG. 4

[56] References Cited

U.S. PATENT DOCUMENTS 2,612,209 9/1952 Alldredge ...................... 297/DIG. 4
2,642,296 6/1953 Leber .................................. 280/781
3,704,040 11/1972 Davis .................................. 280/781
4,159,749 7/1979 Boushek ............................... 280/781

FOREIGN PATENT DOCUMENTS 1541312 1/1970 Fed. Rep. of Germany .

*Primary Examiner*—Robert R. Song
*Attorney, Agent, or Firm*—William D. Hall

[57] ABSTRACT

A supporting frame for a wheelchair seat includes an axle tube mounting rear wheels, tubular side members pivotally mounted on the axis tube and carrying front castor wheels, a front transverse tube of rectangular cross-section connected to the side members by pin connections allowing limited vertical movement of the side members relative to each other, and a T-shaped member, the lower end of the upright limb thereof being connected to the middle of the front tube to allow turning of the T-shaped member about a middle longitudinal axis, and the horizontal limb thereof bearing the front of the wheelchair seat.

7 Claims, 1 Drawing Figure

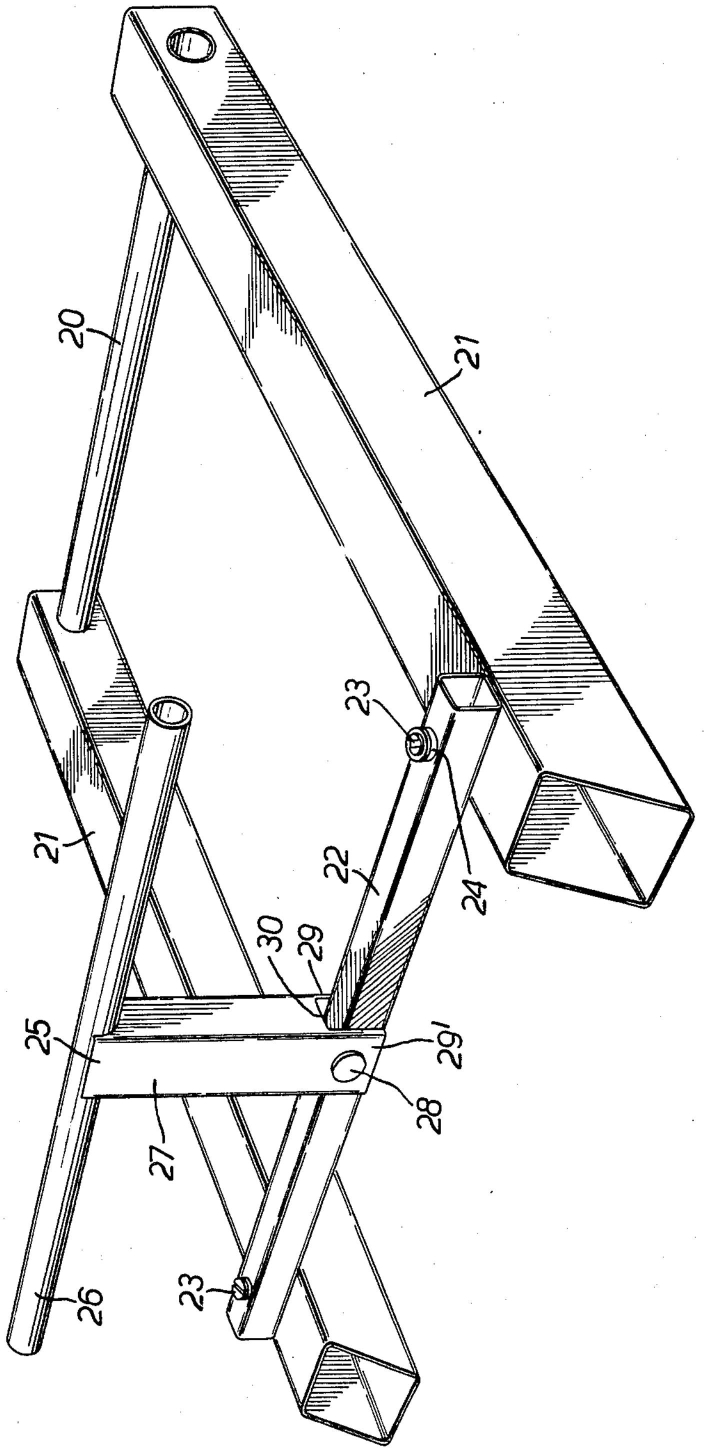
20
21
23
21
22
24
30
29
25
29'
28
27
26
23

SUPPORTING FRAME FOR A VEHICLE SEAT

BACKGROUND OF THE INVENTION

FIELD OF THE INVENTION

This invention relates to a supporting frame for a vehicle seat, more particularly a wheelchair seat.

Summary of the Invention

According to the present invention, there is provided a supporting frame for a vehicle seat, comprising longitudinal, substantially rigid, first and second frame members extending at respective opposite sides of said frame, pivot means pivotably mounting said first and second frame members at respective adjacent end zones thereof for turning about a transverse axis, a transverse, substantially rigid, third frame member having its end zones connected to the respective first and second frame members at the other adjacent end zones thereof in such a manner that said other adjacent end zones can move up and down relative to each other to a limited extent, and a substantially rigid, fourth frame member connected to said third frame member by a mounting at the middle of said third frame member allowing turning of said fourth frame member about a middle longitudinal axis relative to said third frame member, said fourth frame member serving to bear said seat and being restrained against excessive turning about said middle longitudinal axis.

BRIEF DESCRIPTION OF THE DRAWING

In order that the invention may be clearly understood and readily carried into effect, reference will now be made, by way of example, to the accompanying drawing, which shows a diagrammatic perspective view of a supporting frame of a seat of a wheelchair.

DESCRIPTION OF THE PREFERRED EMBODIMENT

Referring to the drawing, an axle tube 20 which mounts the rear wheels of the wheelchair also pivotally mounts respective opposite side frame members 21 of the supporting frame of the seat of the wheelchair. These members 21 are rigid tubes of rectangular cross-section, are mounted on the axle tube 20 at their rear end zones which support the rear of the wheelchair seat, and carry downwardly depending front ground castor wheels (not shown) at their respective front end zones. These front end zones also support respective end zones of the transverse frame member 22 which is a rigid tube of rectangular cross-section. Each member 21 is connected to the member 22 by a pin connection in the form of a nut-and-bolt connection 23 allowing a limited amount, for example two inches, of vertical movement of the members 21 relative to each other. To cushion this movement, each nut-and-bolt connection 23 can include a rubber mount 24. The castor wheels are mounted in position by the connections 23. A T-shaped rigid frame member 25 is connected to the member 22 at the middle of the member 22 in such a manner as to allow turning of the member 25 about a middle longitudinal axis relative to the member 20 to a limited extent. The member 25 includes a transverse horizontal tubular limb 26 which bears the front of the wheelchair seat (not shown), and an upright tubular limb 25 which is of rectangular cross-section. The limb 27 is connected at its lower end to the member 22 by way of a pivot pin 28 providing the middle longitudinal axis. The pin 28 extends through the member 22 and through two arm portions 29 of the limb 27 embracing the member 22. Abutment portions 30 (of which one is hidden in the drawing) alternate with the arm portions 29 and serve to abut against the member 22 to limit turning of the member 25 in respective opposite senses about the pin 28 relative to the member 22.

The seat-supporting frame described above has the advantage of providing a smoother ride for the occupant of the wheelchair. Although the supporting frame is mounted at four points, which are the four wheels of the wheelchair, the seat is mounted at three points, two at the rear of the seat, and one at the front. Thus, the front castor wheels can move up and down relative to each other without tilting the seat correspondingly to one side. Yet the extent to which the castor wheels can move vertically relative to each other is limited by the member 22 limiting the degree of turning of the members 21 relative to each other.

What is claimed is:

1. A supporting frame for a vehicle seat, comprising longitudinal, substantially rigid, first and second frame members extending at respective opposite sides of said frame, pivot means pivotably mounting said first and second frame members at respective adjacent end zones thereof for turning about a transverse axis, a transverse, substantially rigid, third frame member having its end zones connected to the respective first and second frame members at the other adjacent end zones thereof in such a manner that said other adjacent end zones can move up and down relative to each other to a limited extent, and a substantially rigid, fourth frame member connected to said third frame member by a mounting at the middle of said third frame member allowing turning of said fourth frame member about a middle longitudinal axis relative to said third frame member, said fourth frame member serving to bear said seat and being restrained against excessive turning about said middle longitudinal axis.

2. A frame according to claim 1, wherein said fourth frame member is of T shape, with the lower end of the upright limb of the T being situated at said mounting .

3. A frame according to claim 1, wherein said frame members are tubes.

4. A frame according to claim 3, wherein said third frame member is of rectangular cross-section.

5. A frame according to claim 1, wherein the third frame member has its end zones connected to said first and second frame members at said other adjacent end zones thereof by way of substantially vertical pins allowing said other adjacent end zones to move up and down relative to each other to a limited extent.

6. A frame according to claim 1, wherein said mounting comprises a pivot pin carried by said third frame member and providing said middle longitudinal axis, and arm portions of said fourth frame member embracing said third frame member and borne by said pivot pin, there being abutment portions of said fourth frame member alternating with the arm portions and serving to abut against said third frame member to limit turning of said fourth frame member in respective opposite senses about said middle longitudinal axis relative to said third frame member.

7. In a wheelchair, a frame according to claim 1, said pivot means being supported by rear ground wheels of said wheelchair, and said other adjacent end zones being at the front of said wheelchair and being connected to respective front ground wheels of said wheelchair.

* * * * *